United States Patent
Kang

(10) Patent No.: US 6,875,265 B1
(45) Date of Patent: Apr. 5, 2005

(54) HIGH-PERFORMANCE PERMEABLE CONCRETE

(76) Inventor: Sung Soon Kang, #304 Hojeong Villa, 679 Iiwon-dong, Kangnam-gu, Seoul (KR), 135-230

( * ) Notice: Subject to any disclaimer, the term of this patent is extended or adjusted under 35 U.S.C. 154(b) by 0 days.

(21) Appl. No.: 10/804,313

(22) Filed: Mar. 19, 2004

(30) Foreign Application Priority Data

Feb. 6, 2004 (KR) .............................. 10-2004-0007859

(51) Int. Cl.$^7$ ............................................... C04B 7/14
(52) U.S. Cl. ...................... 106/714; 106/712; 106/717
(58) Field of Search ................................ 106/712, 714, 106/717

(56) References Cited

U.S. PATENT DOCUMENTS 6,752,865 B2 * 6/2004 Nayak et al. ............... 106/693

FOREIGN PATENT DOCUMENTS

JP 2001-32402 * 2/2001

OTHER PUBLICATIONS

Derwent Abstract No. 1997–435680, abstract of Brazil Patent Specification No. 9504344 (Sep./1997).*

* cited by examiner

Primary Examiner—Anthony J. Green
(74) Attorney, Agent, or Firm—Madson & Metcalf

(57) ABSTRACT

The present invention relates to an improved high-performance permeable concrete obtained by spreading and compacting a mixture which comprises 1,500–1,850 kg/m$^3$ of aggregates; 320–400 kg/m$^3$ of Portland cement; 28–35% of the cement (90–140 kg/m$^3$) of water; 2–5% of the cement (6–20 kg/m$^3$) of a pigment; and 3–10% of the cement (10–40 kg/m$^3$) of charcoal dust, 7–15% of the cement (22–60 kg/m$^3$) being substituted for particulates of blast furnace slag, and having the compressive strength of 120–300 kgf/cm$^2$ and the permeability coefficient of $2 \times 10^{-2}$ cm/sec or more. The permeable concrete according to the present invention is environmental friendly and has excellent strength and permeability.

8 Claims, No Drawings

HIGH-PERFORMANCE PERMEABLE CONCRETE

FIELD OF THE INVENTION

The present invention relates to an improved high-performance permeable concrete, and more particularly to a high-performance permeable concrete which uses charcoal dust and particulates of blast furnace slag obtainable as a by-product in an iron and steel mill, overcoming disadvantages of conventional permeable concrete and resulting in excellent strength and permeability, and which can be used for bicycle tracks, sidewalks, parking lots, squares and the like.

BACKGROUND OF THE INVENTION

Pavement of roads is largely divided into impermeable pavement and permeable pavement. Asphalt pavement and ready-mixed concrete pavement are examples of the impermeable pavement, through which rain or water does not sink into the ground, thus reducing the time for the rain to flow into the river or stream and increasing the likelihood of flooding. Also, such impermeable pavement causes draining of underground water, and causes environmental issues such as so-called heat island effect due to the increase of surface area.

Therefore, the permeable pavement has come into use more widely, especially on sidewalks, bicycle paths, squares, etc.

In general, a permeable concrete pavement comprises aggregates of the size generally less than 13 mm to maintain suitable porosity and strength, allowing water or rain to seep into the ground through pores among the aggregates and fostering the growth of trees and plants around the pavement. It also prevents flooding of the river by allowing heavy or torrential rain to flow under the earth. Further, as the rain or water does not stay on the permeable concrete pavement, it provides less slippery and much safer walking, jogging or driving conditions.

Such conventional permeable pavement is divided into a permeable asphalt concrete and a permeable cement concrete. However, the asphalt concrete has disadvantages in that the surface deforms considerably due to high temperatures during the summer season and the pores get clogged up due to the viscosity of the asphalt. Also, the cement concrete is so rigid that people get hurt when they fall upon it.

In addition, the conventional permeable-concrete pavement is covered with epoxy pigments for cosmetic view of the surface, but a ramp covered with such epoxy pigments is more slippery than a normal concrete pavement, causing problems in safety. Further, when the pores are covered with dust, permeability deteriorates, thus increasing maintenance costs for declogging the pores, i.e. removal of the dust.

As for the permeable cement concrete, there have been disadvantages of efflorescence, i.e. whitening effect, by which soluble cement components move to the surface of the concrete together with moisture and turn out to be white educt; cracking caused by its coefficient of contraction and expansion larger than normal concrete (if line cutting is not done before curing, for example, within 24 hours after pouring the concrete); swelling (rising) which occurs in winter by the frozen water's increase in volume and its rising or extending above the surface of the earth; and segregating or breaking of the aggregates of the pavement caused by calcium chloride scattered on roads in winter.

Therefore, various attempts to improve the disadvantages of the conventional permeable concrete have been suggested.

For example, in order to prevent the whitening effect, the permeable cement was hardened closely by lowering the ratio of water, or waterproof agents such as stearic acid and paraffin emulsion were added to suppress the movement of moisture.

In order to prevent the cracks, interval of the line cutting was shortened and fiber was reinforced. Also, for the prevention of swelling, a drainage way was made to lower the level of underground water, or a granular layer was provided above the level of underground water to block the capillary rise.

However, decisive and clear solutions to these disadvantages have not yet been suggested.

The inventor of the present invention studied and researched into materials for permeable concrete pavements, and as a result, the inventor completed the present invention by using charcoal dust and particulates of blast furnace slag obtainable as a by-product in an iron and steel mill, to overcome disadvantages of the conventional permeable concrete, thus resulting in production of a permeable concrete having excellent strength and permeability.

In general, charcoal is a black, porous, carbonaceous material comprising 85% of carbon, 10% of moisture and 3% of mineral such as calcium, potassium, magnesium and iron, etc. and is produced by the destructive distillation of wood (carbonation) at the temperatures of 600–900° C. It is odorless and tasteless. If the charcoal is looked into through an electron microscope, it has numerous micropores in a micron unit, which influence the sectional area of the charcoal in contact with the air. Surprisingly, 1 g of the charcoal has about 297 $m^2$ sectional area, which means that charcoal has excellent permeability and water retention ability. The charcoal having such a large surface area can be used to adsorb gases as a deodorizing agent or to absorb impurities, and also can be used as an antiseptic by preventing against putrefaction.

Meanwhile, the blast furnace slag is obtained in producing pig iron from iron ore in a blast furnace, and the slag's fineness significantly improves viscosity and fluidity of concrete and reduces bleeding. If particulates of the blast furnace slag having high fineness are substituted for about 30–50% of normal concrete, the strength of the cement can be greatly increased. Therefore, the blast furnace slag can be useful in high-rise reinforced concrete buildings or in concrete construction for lower stories of reinforced-concrete towers or basement construction.

SUMMARY OF THE INVENTION

The object of the present invention is to provide a high-performance permeable concrete which uses potentially hydraulic and pozzolana properties of particulates of blast furnace slag in substitution for a part of cement to increase fineness of the concrete, thus preventing the whitening effect and enhancing the strength, and which has an excellent chemical resistance to sea water.

Another object of the present invention is to provide an improved high-performance permeable concrete, which prevents sliding on surface thereof by spreading polymer resin (e.g., epoxy, urethane or degenerated acrylic resin) including urethane powder on the surface, and which uses charcoal dust, being multifunctional, e.g. in deodorization, water purification, radiation of far infrared rays, generation of anions, antibiosis and adsorption.

A further object of the present invention is to provide a high-performance permeable concrete which is environmental friendly and helpful to the health of pedestrians by using blast furnace slag and charcoal dust as materials for permeable concrete pavement.

In order to achieve the above objects, the improved high-performance permeable concrete according to the present invention is obtained by spreading and compacting a mixture of 1,500–1,850 kg/m³ of rubble aggregates and/or recycled aggregates which comprise 10–30% of the aggregates of the size 5 mm or less, 50–80% of the size 5–10 mm, and the balance of the size 10–13 mm; 320–400 kg/m³ of Portland cement; 28–35% of the cement (90–140 kg/m³ of water; 2–5% of the cement (6–20 kg/m³) of a pigment; and 3–10% of the cement (10–40 kg/m³) of charcoal dust, wherein 7–15% of the cement (22–60 m is substituted for particulates of blast furnace slag, and has the compressive strength of 120–300 kgf/cm² and the permeability coefficient of $2 \times 10^{-2}$ cm/sec or more.

In the present invention, in order to reinforce the performance of the permeable concrete, 600–1,200 g/m³ of polyvinyl alcohol fiber, which is concrete hydrophilic, may be further provided to the mixture. By doing this, cracks of the permeable concrete can be prevented.

Further, by spreading polymer resin (e.g., epoxy, urethane or degenerated acrylic resin) including urethane powder of the size 0.01–0.5 mm on the surface of the permeable concrete layer, sliding on the surface can be prevented.

In regard to the blast furnace slag, while it was to be used in replacement of 30–50% of the Portland cement to enhance the strength of conventional concrete, the increase of the strength of the permeable concrete was observed when the particulates of the blast furnace slag was used in replacement of only 7–15% of the cement.

DETAILED DESCRIPTION OF THE PREFERRED EMBODIMENTS

The principal of the present invention will be described in more detail below with reference to the embodiments, but the scope of the invention is not limited within the embodiments.

Three kinds of permeable concrete according to the present invention were manufactured by using particulates of blast furnace slag in replacement of 0%, 10% and 20% of respective Portland cement, which was used in the amount of 340, 360 and 380 kg.

Compressive strength, tensile strength, bending strength, permeability coefficient and porosity of the permeable concrete obtained were tested and the results as shown in the following table.

From the table, it is clear that the best compressive strength, tensile strength and bending strength were obtained when the particulates of the blast furnace slag was used in the amount of 10% of the cement.

| Unit cement (kg) | Size of aggregate (mm) | Water/cement ratio (%) | Blast furnace slag (%) | Compressive strength (kgf/cm²) | Tensile strength (kgf/cm²) | Bending strength (kgf/cm²) | Permeability coefficient (cm/sec) | Porosity (%) |
|---|---|---|---|---|---|---|---|---|
| 340 | 5–13 | 28 | 0 | 181 | 21 | 52 | $2.4 \times 10^{-1}$ | 9.1 |
|  |  |  | 10 | 184 | 23 | 55 | $1.5 \times 10^{-1}$ | 8.5 |
|  |  |  | 20 | 157 | 22 | 51 | $6.1 \times 10^{-2}$ | 7.4 |
| 360 | 5–13 | 28 | 0 | 202 | 25 | 55 | $1.9 \times 10^{-1}$ | 7.9 |
|  |  |  | 10 | 218 | 29 | 63 | $1.2 \times 10^{-1}$ | 7.6 |
|  |  |  | 20 | 212 | 26 | 60 | $5.8 \times 10^{-2}$ | 7.4 |
| 380 | 5–13 | 28 | 0 | 210 | 28 | 57 | $1.3 \times 10^{-1}$ | 7.0 |
|  |  |  | 10 | 237 | 31 | 69 | $8.7 \times 10^{-2}$ | 7.5 |
|  |  |  | 20 | 231 | 29 | 68 | $5.6 \times 10^{-2}$ | 7.3 |

Methods of manufacturing and constructing the high-performance permeable concrete of the present invention are the same as conventional ones.

The improved high-performance permeable concrete according to the present invention can be used for bicycle paths, sidewalks, parking lots, squares and the like.

As described above, the high-performance permeable concrete according to the present invention is effective in the preservation of underground water resources and the prevention of flooding. Also, the present invention has an increased strength and prevents the whitening effect.

Further, according to the present invention, particulates of the blast furnace slag used as a substitution for a part of cement increase fineness of the permeable concrete, and as a result, the particulates enhance the strength and provide an excellent chemical resistance to sea water.

Furthermore, the improved high-performance permeable concrete obtained according to the present invention prevents sliding on surface thereof by spreading polymer resin (e.g., epoxy, urethane or degenerated acrylic resin) including urethane powder on the surface, and uses charcoal dust, thus being multifunctional in various fields, e.g. in deodorization, water purification, radiation of far infrared rays, generation of anions, antibiosis and adsorption.

It will be apparent to those skilled in the art that various modifications and variations can be made to the present invention without departing from the spirit and scope of the invention. The present invention covers the modifications and variations thereof provided they come within the scope of the appended claims and their equivalents.

What is claimed is:

1. Permeable concrete obtained by spreading and compacting a mixture which comprises 1,500–1,850 kg/m³ of aggregates; 320–400 kg/m³ of Portland cement including 22–60 kg/m³ of particulates of blast furnace slag; 90–140 kg/m³ of water; 6–20 kg/m³ of a pigment; and 10–40 kg/m³ of charcoal dust, and having a compressive strength of 120–300 kgf/cm² and a permeability coefficient of $2 \times 10^{-2}$ cm/sec or more.

2. The permeable concrete as claimed in claim 1, wherein the aggregates are selected from rubble aggregates, recycled aggregates or a mixture thereof, and wherein 10–30% of the aggregates have a size of 5 mm or less, 50–80% of the aggregates have a size of 5–10 mm, and the balance of the aggregates have a size of 10–13 mm.

3. The permeable concrete as claimed in claim 1, wherein 600–1,200 g/m$^3$ of polyvinyl alcohol fiber, which is concrete hydrophilic, is further provided to the mixture to prevent cracks of the permeable concrete.

4. The permeable concrete as claimed in claim 2, wherein 600–1,200 g/m$^3$ of polyvinyl alcohol fiber, which is concrete hydrophilic, is further provided to the mixture to prevent cracks of the permeable concrete.

5. The permeable concrete as claimed in claim 1, further comprising a polymer resin including urethane powder of the size 0.01–0.5 mm spread on a surface of the permeable concrete.

6. The permeable concrete as claimed in claim 2, further comprising a polymer resin including urethane powder of the size 0.01–0.5 mm spread on a surface of the permeable concrete.

7. The permeable concrete as claimed in claim 5, wherein the polymer resin is selected from epoxy, urethane, or degenerated acrylic resin.

8. The permeable concrete as claimed in claim 6, wherein the polymer resin is selected from epoxy, urethane, or degenerated acrylic resin.

* * * * *